(12) United States Patent
Li et al.

(10) Patent No.: US 8,737,206 B2
(45) Date of Patent: May 27, 2014

(54) WIRELESS NETWORK DEVICE, WIRELESS NETWORK SYSTEM AND METHOD OF CONTROLLING SELECTION OF ROUTINGS

(75) Inventors: Cheng Li, Beijing (CN); Jun Tian, Beijing (CN); Chao Lv, Beijing (CN); Hao Wang, Beijing (CN)

(73) Assignee: Fujitsu Limited, Kawasaki (JP)

( * ) Notice: Subject to any disclaimer, the term of this patent is extended or adjusted under 35 U.S.C. 154(b) by 235 days.

(21) Appl. No.: 13/283,800

(22) Filed: Oct. 28, 2011

(65) Prior Publication Data

US 2012/0106453 A1   May 3, 2012

(30) Foreign Application Priority Data

Oct. 29, 2010   (CN) .......................... 2010 1 0530395

(51) Int. Cl.
*G01R 31/08* (2006.01)
(52) U.S. Cl.
USPC .......................................... 370/229; 370/328
(58) Field of Classification Search
None
See application file for complete search history.

(56) References Cited

U.S. PATENT DOCUMENTS

| | | | | |
|---|---|---|---|---|
| 5,715,277 | A * | 2/1998 | Goodson et al. | 375/222 |
| 6,243,376 | B1 * | 6/2001 | Ng et al. | 370/352 |
| 7,907,520 | B2 * | 3/2011 | Kotrla et al. | 370/229 |
| 2002/0150041 | A1 * | 10/2002 | Reinshmidt et al. | 370/216 |
| 2007/0053295 | A1 | 3/2007 | Cleveland et al. | |
| 2008/0159142 | A1 | 7/2008 | Nagarajan et al. | |
| 2008/0288741 | A1 * | 11/2008 | Lee et al. | 711/200 |
| 2012/0106453 | A1 * | 5/2012 | Li et al. | 370/328 |

FOREIGN PATENT DOCUMENTS

| | | |
|---|---|---|
| CN | 101217497 | 7/2008 |
| CN | 101753273 | 6/2010 |
| EP | 2 244 423 | 10/2010 |
| GB | 2 413 723 | 11/2005 |

OTHER PUBLICATIONS

Peng Yang. "Routing Algorithm based on Optimal Delay for Mobile Ad Hoc Network" Computer Engineering and Design, vol. 30, No. 4, 2009, pp. 862-864.
Chen Zhe Yu, et al. "An Improvement of AODV Based on Delay" Institute of Signal Processing and Transmission, Nanjing University of Posts & Telecommunications, Nanjing 210003, P.R. China, 2009, pp. 234-239.
Han Gang, et al. "An Enhanced AODV Protocol with Low Delay for Multimedia Application in MANET" School of Computer, National University of Defense Technology, Dec. 31, 2008, pp. 1632-1636.

(Continued)

*Primary Examiner* — Robert Wilson
(74) *Attorney, Agent, or Firm* — Katten Muchin Rosenman LLP

(57) ABSTRACT

Embodiments of the present invention disclose a wireless network device, a wireless network system and a method of controlling selection of routings. The wireless network device includes: a memory configured to store routing latency information for routing from the wireless network device to other nodes in a network; a processor configured to determine transmission latency requirement of transmitting data packets from the wireless network device to a destination node according to transmission latency requirement information carried in the data packets after obtaining the data packets to be transmitted, query available routes from the wireless network device to the destination node, and the stored latency information corresponding to the available routes, select a route most approximate to the determined transmission latency requirement from the available routes according to a query result of the query module, and transmit the data packets.

11 Claims, 5 Drawing Sheets

(56) References Cited

OTHER PUBLICATIONS

European Search Report dated Jan. 25, 2012, from corresponding European Application No. 11 18 6787.
European Communication pursuant to Article 94(3) EPC dated Apr. 11, 2013, from corresponding European Application No. 11 186 787.5-1862.
Notification of First Office Action, dated Nov. 19, 2013, from corresponding Chinese Application No. 201010530395.8.
Communication pursuant to Article 94(3) EPC, dated Nov. 20, 2013, from corresponding European Patent Convention Application No. 11 186 787.5-1862.

* cited by examiner

WIRELESS NETWORK DEVICE, WIRELESS NETWORK SYSTEM AND METHOD OF CONTROLLING SELECTION OF ROUTINGS

TECHNICAL FIELD

The present invention generally relates to the technical field of wireless communication, and especially to a wireless network device, a wireless network system and a method of controlling selection of routings.

BACKGROUND

In recent years, the wireless communication technique has gained a rapid development. The wireless ad hoc network is applied to various fields because of its advantages of needing no preset network facility, fast automatic networking or the like.

Routing protocols are focus in the ad hoc network research. Presently, researchers have proposed several protocols applicable for routing in the ad hoc network. According to mechanisms for obtaining routing information in the protocols, these protocols are generally divided into initiative routing protocols and on-demand routing protocols. The route discovery policy of the initiative routing protocols is similar to that of conventional routing protocols. In the initiative routing protocols, each node in the network should transmit the latest routing information periodically to other nodes, and each node should save one or more routing tables to store the routing information. As compared with the initiative routing protocols, in the on-demand routing protocols, a source node initiates operations for establishing a route only when the source node needs to transmit data to a destination node. Therefore, contents of the routing tables are established on-demand, and after completing the data transmission, it is possible to terminate the route maintenance.

According to existing on-demand routing protocols, implementing communication mainly comprises two processes of route establishment and data transmission. The route establishment may be further divided into two phases of route discovery and route selection. In the route discovery phase, a data source node searches for routes by broadcasting route request messages to neighbor nodes. If the destination node receives the route request messages transmitted in multiple paths, in the route selection phase, the path where the route request message with the minimum hops originates is selected to establish the route for subsequent data transmission.

The above manner of selecting the route having the minimum hops cannot ensure the latency performance of data in the network transmission, although it is able to complete the data transmission with less overhead. In transmission processes such as voice service, video service or the like, there is higher requirement on data latency performance. If latency jitter of data packets to a destination node is too significant, the service may be not continuous, thereby badly influencing the service quality.

SUMMARY

In view of this, embodiments of the present invention provide a wireless network device, a wireless network system and a method of controlling route selection. By applying the approaches according to the embodiments of the present invention, routing latency information for routing from a node to other nodes in a network is pre-stored in the node. When requiring to transmit data packets, route selection is performed according to requirement on transmission latency of the data packets, so that the data packets can be transmitted to the destination node within a stable latency range, thus improving the service quality.

The embodiments of the present invention include a wireless network device, comprising:

a latency information storage module for pre-storing routing latency information for routing from the wireless network device to other nodes in a network;

a latency requirement determination module for determining transmission latency requirement of transmitting data packets from the wireless network device to a destination node according to transmission latency requirement information carried in the data packets after obtaining the data packets to be transmitted;

a query module for querying available routes from the wireless network device to the destination node, and the pre-stored latency information corresponding to the available routes;

a route selection module for selecting a route most approximate to the determined transmission latency requirement from the available routes according to a query result of the query module, to transmit the data packets.

According to another aspect of the embodiments of the present invention, a wireless network system comprising a wireless network device as described in the above is provided.

According to another aspect of the embodiments of the present invention, a method of controlling route selection is provided. The method comprises:

pre-storing, in a node, routing latency information for routing from the node to other nodes in a network;

determining by the current node transmission latency requirement of transmitting data packets from the present node to a destination node according to transmission latency requirement information carried in the data packets after the present node obtains the data packets to be transmitted;

querying an available route from the present node to the destination node and the pre-stored latency information corresponding to the available route;

selecting a route most approximate to the determined transmission latency requirement from the available routes according to the query result, to transmit the data packets.

According to another aspect of the embodiments of the present invention, a program product with machine-readable instruction codes stored thereon is provided. When the instruction codes are read and executed by a machine, the method of controlling route selection can be executed.

According to another aspect of the embodiments of the present invention, a storage medium with machine-readable instruction codes carried thereon is provided. When the instruction codes are read and executed by a machine, the method of controlling route selection can be executed.

Various specific implementations of the embodiments of the present invention are provided in the following description sections. Detailed description is used to sufficiently disclose preferable embodiments of the present invention without imposing any limitation to them.

BRIEF DESCRIPTION OF DRAWINGS

In connection with specific embodiments and by referring to accompanying drawings, the above and other objects and advantages of the embodiments of the present invention will be further described. In the accompanying drawings, identical or corresponding technical features or components will be represented with identical or corresponding reference numbers. In the accompanying drawings.

DETAILED DESCRIPTION

Figure 1:
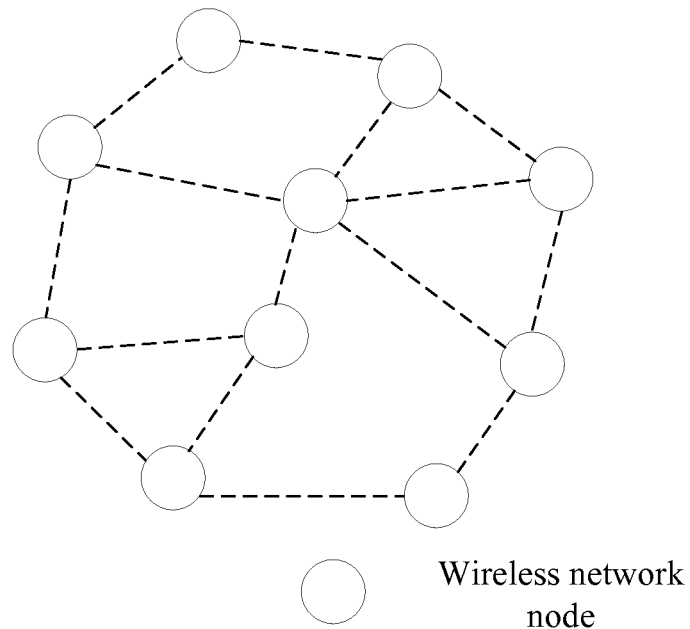
FIG. 1 is a schematic diagram of a planar network structure.

The embodiments of the present invention are below described by referring to the drawings.

Approaches provided in the embodiments of the present invention are applicable to wireless ad hoc networks with a planar network structure. FIG. 1 is a schematic diagram of the planar network structure. In the planar network structure, nodes are peer, and have uniform functional characteristics. There may be no central management node in the network.

Operating manners of the existing on-demand routing protocols will be described in the following by taking the Ad hoc on demand distance vector routing (AODV) protocol as an example.

AODV is a typical on-demand routing protocol. When a node of the network has data transmission demand, the node acts as a source node to broadcast RREQ (route request) messages to neighbor nodes to search for a route, and intermediate nodes receiving the RREQ messages forward the RREQ messages, and record source nodes and temporary paths returning to the source nodes. After the destination node of the data transmission receives the RREQ messages, if multiple available routes is discovered, the available route with the minimum hops is selected, and a RREP (route reply) message is returned to the source node, thereby establishing a route from the source node to the destination node. After the route establishment, the source node utilizes the route to transmit data to the destination node.

According to the approaches provided by the embodiments of the present invention, Routing latency information for routing from a node to other nodes in a network is pre-stored in the node. When the node requires to perform data packet transmission, the route selection is performed according to transmission latency requirement of the data packets and pre-stored routing latency information. Therefore, it is able to transmit the data packets to the destination node within a stable latency range, thus improving the service quality.

In an embodiment of the present invention, a wireless network device is provided. The wireless network device may correspond to a network node in the wireless ad hoc network, or correspond to a portion of functional modules in the network node.

Figure 2:
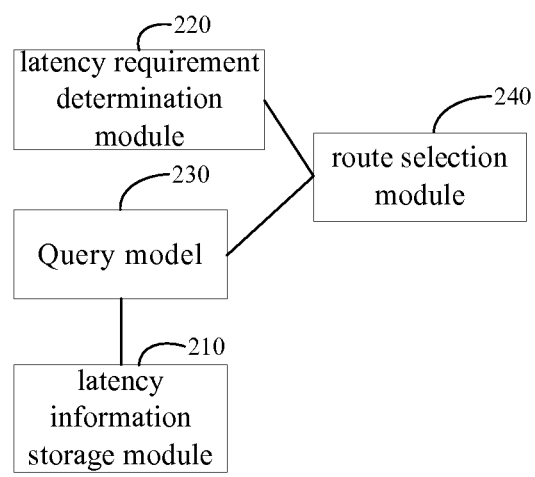
FIG. 2 is a schematic diagram illustrating the structure of a wireless network device according to an embodiment of the present invention.

FIG. 2 is a schematic diagram illustrating a structure of the wireless network device provided by the embodiment of the present invention. The device includes a latency information storage module 210, a latency requirement determination module 220, a query module 230 and a route selection module 240.

As can be understood by one skilled in the art, in specific applications such as wireless sensor network or the like, the wireless network device may also include basic modules for power supply, data collection and data processing. These modules are not illustrated in FIG. 2.

The latency information storage module 210 is adapted for pre-storing routing latency information for routing from the wireless network device to other nodes in the network.

The latency requirement determination module 220 is adapted for determining transmission latency requirement of transmitting data packets from the wireless network device to a destination node according to transmission latency requirement information carried in the data packets after obtaining the data packets to be transmitted.

The query module 230 is adapted for querying available routes from the wireless network device to the destination node, and the pre-stored latency information corresponding to the available routes.

The routing selection module 240 is adapted for selecting a route most approximate to the transmission latency requirement determined by the latency requirement determination module 220 from the available routes according to the query result of the query module, to transmit the data packets.

The operating manner of the wireless network device provided by the embodiments of the present invention will be described in connection with a specific network structure.

Figure 3:
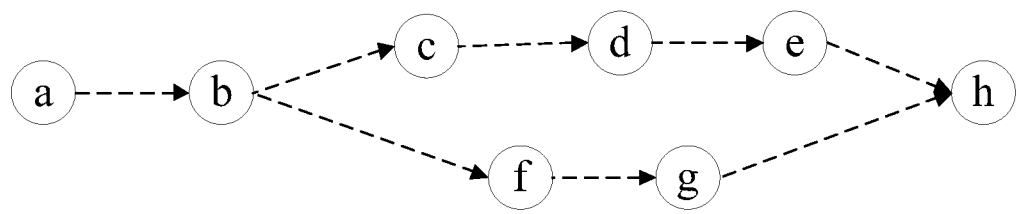
FIG. 3 is a schematic diagram illustrating the structure of a network according to an embodiment of the present invention.

FIG. 3 illustrates a wireless ad hoc network of planar structure, where a~h are nodes in the network. Assuming that is required to transmit data from node a to node h, there are two available routes for a→h:

Route 1: a→b→c→d→e→h
Route 2: a→b→f→g→h

According to the wireless network device provided in the above: first, in the latency information storage module 210 of the node, routing latency information for routing from the node to other nodes in the network is pre-stored in the node. It is possible to directly utilize the transmitting/receiving latency of a RREQ/RREP message in the route discovery phase as the routing latency information. It is also possible to transmit a certain number of test packets, and utilize statistics on the transmitting/receiving latency of these test packets as the routing latency information.

As can be understood, according to the specific network illustrated in FIG. 3, there is no need for intermediate nodes c, d, e, f, g to perform the route selection operation. Therefore, it is also possible to not save the latency information of route 1 and route 2 in these nodes.

In an implementation of the present embodiment, it is possible to directly perform the route selection operation by the source node:

Assuming a data packet to be transmitted requires a latency of 10 ms for the transmission from a to h, the latency requirement determination module 220 of the source node a may directly determine the transmission latency requirement from a to h as 10 ms.

The query module 230 finds that there are two available routes according to the destination node h of the data packet:

route 1 and route 2, and further finds the following routing latency information saved in the latency information storage module 210:

Route 1: 9 ms
Route 2: 12 ms

According to the query result of the query module 230, it is apparent that the latency (9 ms) of the route 1 is more approximate to the latency requirement (10 ms) obtained by the latency requirement determination module 220. Therefore, the route selection module 240 will select the route 1 to perform the data packet transmission.

Of course, in actual applications, the route selection module 240 may also adopt more flexible selection manners. For example, if there are multiple routes with latency of 9 ms, it is possible to select one of them randomly. It is also possible to preferentially select a route with smaller latency. For example, if there is a route 3 with latency of 11 ms, in case that difference values between the requirement and the route 1 and the route 3 are 1 ms, it is possible to preferentially select the route 1 with smaller latency. Alternatively, it is also possible to select one most approximate to the requirement only from the routes with latency smaller than the requirement. Of course, the above are only several specific selecting policies, and cannot be construed as limitations to the embodiments of the present invention.

According to the above implementations, node a may further carry the result of route selection in the data packets, and thus subsequent nodes no longer perform the route selection operation.

In another implementation of the present embodiment, it is also possible to perform the route selection operation by a node before the routing branch:

For the data source node a, next-hop nodes of two routes to the node h are b. Therefore, the node a actually does not need to perform the route selection operation. That is to say, the node a finds that all the routes to the destination node h have a unique next-hop node b, and then it is possible to directly transmit the data packet to be transmitted to the node b. In the transmitted data packet, the transmission latency requirement information of this data packet is carried. Of course, one skilled in the art knows that in the transmitted data packet, basic information such as source node identifier, destination node identifier, transmitting time or the like may also be carried. The basic information will not be described one by one in the present embodiment.

As can be understood, because node a does not need to perform the route selection operation, it is also possible to not save the latency information of the route 1 and the route 2 in node a.

For node b, next-hop nodes of two routes to the node h are different, and therefore, the node b needs to perform the route selection operation, according to the wireless network device provided in the above:

The latency requirement determination module 220 is adapted for determining transmission latency requirement of transmitting data packets from the wireless network device to a destination node according to transmission latency requirement information carried in the data packets after obtaining the data packets to be transmitted:

Assuming the transmission latency requirement information carried in the data packet is 10 ms, this 10 ms corresponds to the transmission latency requirement of a->h, and the data packet consumes 2 ms for the transmission from a to b. Therefore, it is possible obtain the latency requirement of the data packet from b to h as 10−2=8 ms by calculation. The time consumed by the data packet for transmission from a to b may be obtained by subtracting the time when the node a transmits the data packet from the time when the node b receives the data packet.

The query module 230 finds that there are two available routes according to the destination node h of the data packet: route 1 and route 2, and further finds the following routing latency information saved in the latency information storage module 210:

Route 1: 7 ms
Route 2: 10 ms

According to the query result of the query module 230, it is apparent that the latency (7 ms) of the route 1 is more approximate to the latency requirement (8 ms) obtained by the latency requirement determination module 220. Therefore, the route selection module 240 will select the route 1 to perform the data packet transmission.

In actual wireless propagation environments, transmission time of data between nodes does not necessarily keep constant. For example, actual time for a data packet to transmit from a to b does not necessarily equal to the difference value (2 ms) of the routing latency information stored in a and b. By performing the route selection by a node before the routing branch, it is possible to select a route according to the actual transmission time for data to reach the present location, and therefore, achieve higher reliability relative to the manner of performing the route selection by the source node.

In the present approach, all the available routes to other nodes and their latency information are pre-stored in the latency information storage module 210. That is to say, in the route discovery phase, after the destination node of the data transmission receives the RREQ message, if multiple available routes are discovered, the selection is not directly performed. Instead, the source node or other intermediate nodes are informed of all the available route information, for example by replying RREP messages respectively.

For any node in the network, it is possible to save the transmission latency of the RREQ as the routing latency information.

For example: for a certain route, the destination node may place time t2 when the RREQ message is received from the route in the corresponding RREP message. After the intermediate node or the source node receives the RREP message, a difference between t2 and time t1 when the RREQ is transmitted by itself is calculated, thereby obtaining a corresponding route latency;

Alternatively, for a certain route, the node may also calculate a difference between time t3 when the RREP is transmitted by itself and t1, then divide the difference by 2 to obtain a corresponding route latency. In this way, the routing latency information finally saved is an average of two transmission latency, thus reducing the influence due to randomicity of the transmission latency, and increasing the confidence.

Figure 4:
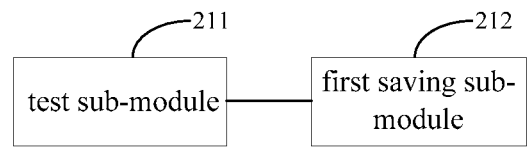
FIG. 4 is a schematic diagram illustrating the structure of a latency information storage module according to an embodiment of the present invention.

Nodes may also obtain the routing latency information with higher confidence through learning. FIG. 4 is a schematic diagram illustrating a structure of the latency information storage module 210. The latency information storage module 210 includes:

A test sub-module 211 for transmitting a predetermined amount of test packets to other nodes in the network for obtaining transmission latencies of the test packets in respective routes;

A first saving sub-module 212 for calculating respectively transmission latency averages of the test packets in the respective routes and saving the transmission latency averages as the routing latency information.

Taking node b illustrated in FIG. 3 as an example, for route 1 and route 2, the node b may transmit a certain number of test packets (for example, 100) to node h respectively. Of course, the number of the test packets transmitted for each route may be equal or not equal. According to the response message replied by the node h, transmission latency values of the multiple test packets for the route 1 and the route 2 are obtained respectively. Then, transmission latency averages for the two routes are calculated respectively, and the transmission latency averages are saved as the routing latency information for the two routes.

Figure 5:
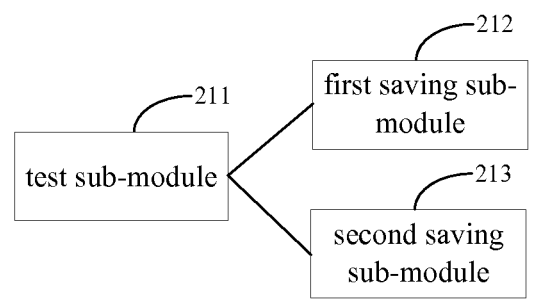
FIG. 5 is a schematic diagram illustrating another structure of the latency information storage module according to an embodiment of the present invention.

FIG. 5 is a schematic diagram illustrating another structure of the latency information storage module 210. On the basis of the structure illustrated in the schematic diagram of FIG. 4, it further includes:

a second saving sub-module 213 for calculating respectively transmission latency variances of the test data packets in the respective routes and saving the transmission latency variances as the routing latency information.

Because statistical methods are utilized in the process of learning, it is possible to further save transmission latency variance of the test packets as the routing latency information. If the transmission latency of the test packets is assumed as a random variable, the transmission latency variance of the test packets can characterize the fluctuation degree of this random variable relative to the transmission latency average of the test packets, and thus can characterize the stability in transmission latency of the route.

Accordingly, in the route selection module 240, it is possible to configure it with various specific selecting policies, for example:

Calculating difference values between the transmission latency requirement and the transmission latency averages in the respective available routes, and selecting the available route with the minimal absolute difference value.

In performing the route selection, it is possible to preferentially select an available route with transmission latency average smaller than the transmission latency requirement. For example, the available route with the minimum transmission latency variance is preferentially selected in case that the absolute difference values corresponding to multiple available routes are equal; alternatively the available route with the minimal absolute difference value is selected only from the available routes with transmission latency average smaller than the transmission latency requirement.

Further, if the transmission latency variance is included in the routing latency information, it is also possible to preferentially select the available route with the minimum transmission latency variance in case that the absolute difference values corresponding to multiple available routes are equal.

For example, the latency requirement obtained by the latency requirement determination module 220 is 8 ms, and the query module 230 finds the following routing latency information saved in the latency information storage module 210 (information in the first portion represents an average of the transmission latencies, and information in the second portion represents the transmission latency variance):

Route 1: 7, 0.2
Route 2: 10, 0.2
Route 3: 7, 0.1

According to the query result of the query module 230, the latency average (7 ms) of the route 1 and the route 3 is more approximate to the latency requirement (8 ms), and the route 3 has the smaller transmission latency variance. Therefore, the route selection module 240 will select the route 3 to perform the data packet transmission.

The smaller transmission latency variance means a lower probability that the actual data transmission latency deviates from the average. Therefore, the route with the minimum transmission latency variance is preferentially selected, which is beneficial for obtaining more stable transmission effect.

Figure 6:
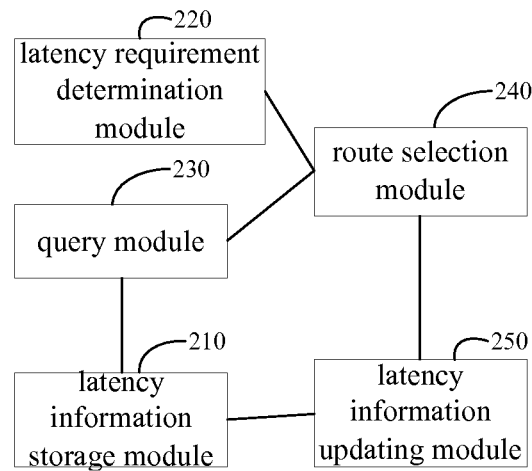
FIG. 6 is a schematic diagram illustrating another structure of the wireless network device according to an embodiment of the present invention.

According to the approaches provided by the embodiments of the present invention, the latency information pre-stored in the latency information storage module 210 does not necessarily keep constant. The latency information storage module 210 may update the latency information saved therein through re-learning or keeping learning. Further, it is also possible to utilize actually transmitted data in the route to update the latency information pre-stored in the latency information storage module 210. As illustrated in FIG. 6, the wireless network device provided in the embodiments of the present invention may further include:

A latency information updating module 250 for updating the latency information pre-stored in the latency information storage module 210 according to the actual latency of the present transmission of the data packet, after transmitting the data packet.

Every actual data transmission can certainly correspond to a corresponding route latency value. This value may also be used to update the pre-stored latency information. As the transmission data packets increase, the number of samples for statistical calculation increases accordingly. Accordingly, it is also possible to increase the confidence of the routing latency information. This approach is especially applicable to the case of utilizing the transmitting/receiving latency of the RREQ/RREP message as the routing latency information.

For the manner of utilizing the statistics associated with the test packets as the routing latency information, the approach is equivalent to increasing the number of tests without increasing the test overhead additionally, and it is possible to enable the routing latency information to represent the latest condition of the network. It is possible to calculate an average or a variance from a new sample space formed of the latency data of actual transmission data packets and all the original test data; it is also possible to delete the older test data after obtaining the new latency data, and then form a new sample space to calculate the average or variance.

The embodiments of the present invention further provide a wireless network system including the above wireless network device. The wireless network device may correspond to a node in the network, or correspond to a portion of functional modules in the network node.

Because nodes in the planar network structure are peer to each other, the nodes in the wireless network system provided by the embodiments of the present invention may have the functional characteristics of the above wireless network device. Of course, according to the topology structure of the network and the routing relation actually established, it is possible for a portion of nodes in the network to not save the routing latency information during the communication, nor perform the route selection operation.

By applying the wireless network system provided by the embodiments of the present invention, routing latency information for routing from a node of the network to other nodes in the network is pre-stored in the node. When the node requires to perform data packet transmission, the route selection is performed by the node according to transmission latency requirement of the data packets and pre-stored routing latency information. Therefore, it is able to transmit the data packets to the destination node within a stable latency range, thus improving the service quality.

Figure 7:
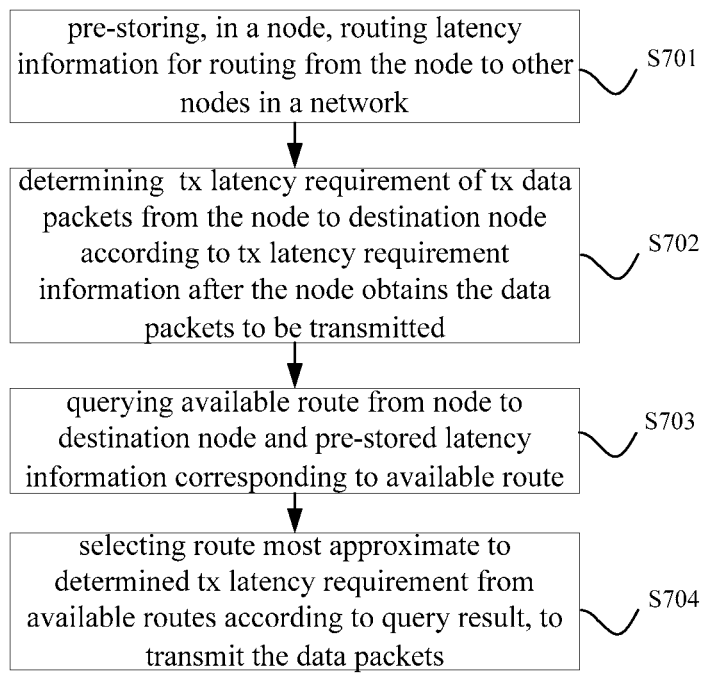
FIG. 7 is a flow chart of a method of controlling route selection according to an embodiment of the present invention.

The embodiments of the present invention further provide a method of controlling route selection. As illustrated in FIG. 7, the method may comprise the following steps:

S701, pre-storing, in a node, routing latency information for routing from the node to other nodes in a network;

S702, determining by the current node transmission latency requirement of transmitting data packets from the present node to a destination node according to transmission latency requirement information carried in the data packets after the present node obtains the data packets to be transmitted;

S703, querying an available route from the present node to the destination node and the pre-stored latency information corresponding to the available route;

S704, selecting a route most approximate to the determined transmission latency requirement from the available routes according to the query result, to transmit the data packets.

Of course, the execution order of S702 and S703 may be interchanged, and this does not affect the implementation of the embodiments of the present invention.

At step S701, for any node in the network, it is possible to save the transmission latency of the RREQ as the routing latency information.

For example, for a certain route, the destination node may place time t2 when the RREQ message is received from the route in the corresponding RREP message. After the intermediate node or the source node receives the RREP message, a difference between t2 and time t1 when the RREQ is transmitted by itself is calculated, thereby obtaining a corresponding route latency;

Alternatively, for a certain route, the node may also calculate a difference between time t3 when the RREP is transmitted by itself and t1, then divide the difference by 2 to obtain a corresponding route latency. In this way, the routing latency information finally saved is an average of two transmission latency, thus reducing the influence due to randomicity of the transmission latency, and increasing the confidence.

Further, nodes may also obtain the routing latency information with higher confidence through learning: first, a node transmits a predetermined amount of test packets to other nodes in the network for obtaining transmission latencies of the test packets in respective routes; then, transmission latency averages of the test packets in the respective routes are calculated respectively, and the transmission latency averages are saved as the routing latency information.

Further, the node may also save the transmission latency variance of the test packets as the routing latency information. Therefore, it is possible to represent the stability of the route transmission latencies.

Accordingly, at step S704, the present node may also adopt various methods to perform the route selection, for example:

Calculating difference values between the transmission latency requirement and the transmission latency averages in the respective available routes, and selecting the available route with the minimal absolute difference value.

In performing the route selection, it is possible to preferentially select an available route with transmission latency average smaller than the transmission latency requirement. For example, the available route with the minimum transmission latency variance is preferentially selected in case that the absolute difference values corresponding to multiple available routes are equal; alternatively the available route with the minimal absolute difference value is selected only from the available routes with transmission latency average smaller than the transmission latency requirement.

Further, if the transmission latency variance is included in the routing latency information, it is also possible to preferentially select the available route with the minimum transmission latency variance in case that the absolute difference values corresponding to multiple available routes are equal.

The smaller transmission latency variance means a lower probability that the actual data transmission latency deviates from the average. Therefore, the route with the minimum transmission latency variance is preferentially selected, which is beneficial for obtaining more stable transmission effect.

Figure 8:
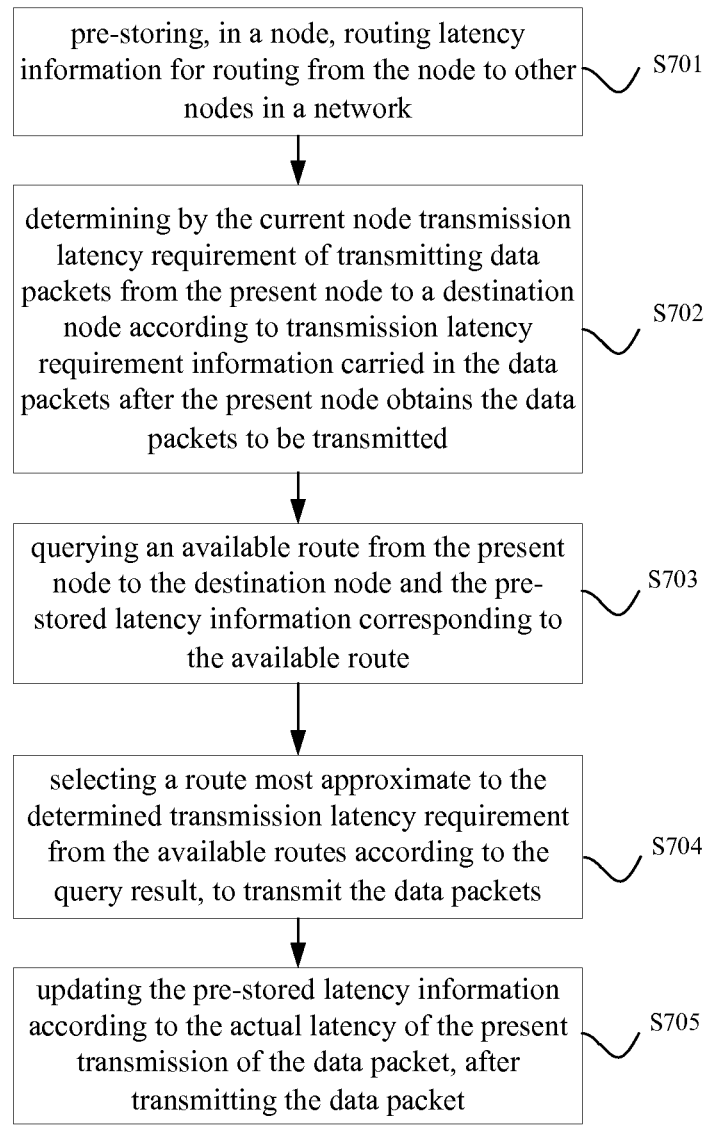
FIG. 8 is another flow chart of the method of controlling route selection according to an embodiment of the present invention.

The embodiments of the present invention further provide a method of controlling route selection. As illustrated in FIG. 8, after step S704, the method may further include a step S705: updating the pre-stored latency information according to the actual latency of the present transmission of the data packet, after transmitting the data packet.

Every actual data transmission can certainly correspond to a corresponding route latency value. This value may also be used to update the pre-stored latency information. As the transmission data packets increase, the number of samples for statistical calculation increases accordingly. Accordingly, it is also possible to increase the confidence of the routing latency information. It is possible to increase the number of tests without increasing the test overhead additionally, and it is also possible to enable the routing latency information to represent the latest condition of the network. In specific implementations, it is possible to calculate an average or a variance from a new sample space formed of the latency data of actual transmission data packets and all the original test data; it is also possible to delete the older test data after obtaining the new latency data, and then form a new sample space to calculate the average or variance.

The steps and their specific operations in the methods of the embodiments of the present invention illustrated in FIG. 7 and FIG. 8 may be performed for example by the wireless network device or wireless network system of the present invention described by referring to FIGS. 2-6 and composition modules thereof, and it is possible to obtain the same or similar technical effects. Specific details can be found in the description about the device or system in the above, and will not be described in detail here.

Further, it should also be noted that, the functions of the device, system and the series of processes of the method according to the above embodiments of the present invention may be implemented through hardware, software and/or firmware. In the case of implementing by software and/or firmware, a program that constitutes the software is installed, from a storage medium or a network, into a personal computer having a dedicated hardware configuration, e.g., a general-purpose personal computer 900 as illustrated in FIG. 9, that when various programs are installed therein, becomes capable of performing various functions and processes, or the like.

Figure 9:
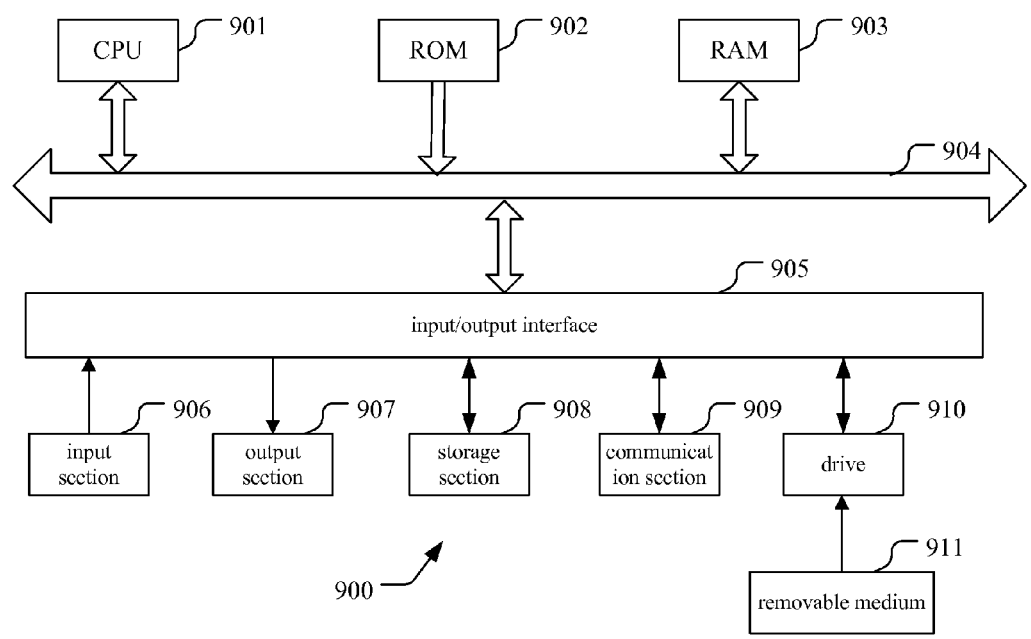
FIG. 9 is a block diagram illustrating an example structure of a personal computer serving as the information process apparatus adopted in the embodiments of the present invention.

In FIG. 9, a central processing unit (CPU) 901 performs various processes in accordance with a program stored in a read only memory (ROM) 902 or a program loaded from a storage section 908 to a random access memory (RAM) 903. In the RAM 903, data required when the CPU 901 performs the various processes or the like is also stored as required.

The CPU 901, the ROM 902 and the RAM 903 are connected to one another via a bus 904. An input/output interface 905 is also connected to the bus 904.

The following components are connected to the input/output interface 905: an input section 906 including a keyboard, a mouse, or the like; an output section 907 including a display such as a cathode ray tube (CRT), a liquid crystal display (LCD), or the like, and a loudspeaker or the like; the storage section 908 including a hard disk or the like; and a communication section 909 including a network interface card such as a LAN card, a modem, or the like. The communication section 909 performs a communication process via the network such as the internet.

A drive 910 is also connected to the input/output interface 905 as required. A removable medium 911, such as a magnetic disk, an optical disk, a magneto-optical disk, a semiconductor memory, or the like, is mounted on the drive 910 as required, so that a computer program read therefrom is installed into the storage section 908 as required.

In the case where the above-described steps and processes are implemented by the software, the program that constitutes the software is installed from the network such as the internet or the storage medium such as the removable medium 911.

One skilled in the art should note that, this storage medium is not limit to the removable medium 911 having the program stored therein as illustrated in FIG. 9, which is delivered separately from the device for providing the program to the user. Examples of the removable medium 911 include the magnetic disk (including a floppy disk (register trademark)), the optical disk (including a compact disk-read only memory (CD-ROM) and a digital versatile disk (DVD)), the magneto-optical disk (including a mini-disk (MD) (register trademark)), and the semiconductor memory. Alternatively, the storage medium may be the ROM 902, the hard disk contained in the storage section 908, or the like, which have the program stored therein and is deliver to the user together with the device that containing them.

It should also be noted that the step in which the above-described series of processes are performed may naturally be performed chronologically in order of description but needed not be performed chronologically. Some steps may be performed in parallel or independently of one another.

It can be seen that, the embodiments of the present invention also disclose a program product with machine-readable instruction codes stored thereon. When the instruction codes are read and executed by a machine, the method of controlling route selection according to the above embodiments of the present invention can be executed. The embodiments of the present invention also disclose a storage medium with machine-readable instruction codes carried thereon. When the instruction codes are read and executed by a machine, the method of controlling route selection according to the above embodiments of the present invention can be executed.

Regarding embodiments including the above embodiments, the following annexes are disclosed:

Annex 1. A wireless network device comprising:
a memory configured to store routing latency information for routing from the wireless network device to other nodes in a network;
a processor configured to determine transmission latency requirement of transmitting data packets from the wireless network device to a destination node according to transmission latency requirement information carried in the data packets after obtaining the data packets to be transmitted,
query available routes from the wireless network device to the destination node, and the stored latency information corresponding to the available routes,
select a route most approximate to the determined transmission latency requirement from the available routes according to a query result of the query module, and transmit the data packets.

Annex 2. The device according to annex 1, wherein the memory is configured to
transmit a predetermined amount of test packets to other nodes in the network for obtaining transmission latencies of the test packets in respective routes,
calculate respectively transmission latency averages of the test packets in the respective routes and save the transmission latency averages as the routing latency information.

Annex 3. The device according to annex 2, wherein the memory is configured to calculate respectively transmission latency variances of the test data packets in the respective routes and save the transmission latency variances as the routing latency information.

Annex 4. The device according to annex 2, wherein the processor is configured to
calculate difference values between the transmission latency requirement and the transmission latency averages in the respective available routes, and select the available route with the minimal absolute difference value.

Annex 5. The device according to annex 4, wherein the processor is further configured to
select preferentially the available route having the transmission latency average smaller than the transmission latency requirement.

Annex 6. The device according to annex 3, wherein the processor is configured to
calculate difference values between the transmission latency requirement and the transmission latency averages in the respective available routes, select the available route with the minimal absolute difference value,
select preferentially the available route with the minimum transmission latency variance in case that the absolute difference values corresponding to multiple available routes are equal.

Annex 7. The device according to annex 1, the processor configured to:
update the latency information stored in the memory according to the actual latency of the present transmission of the data packet, after transmitting the data packet.

Annex 8. A wireless network system, comprising the wireless network device according to annex 1.

Annex 9. A method of controlling route selection, comprising:
storing, in a node, routing latency information for routing from the node to other nodes in a network;
determining by the current node transmission latency requirement of transmitting data packets from the present node to a destination node according to transmission latency requirement information carried in the data packets after the present node obtains the data packets to be transmitted;
querying an available route from the present node to the destination node and the stored latency information corresponding to the available route;
selecting a route most approximate to the determined transmission latency requirement from the available routes according to the query result, to transmit the data packets.

Annex 10. The method according to annex 9, wherein storing routing latency information for routing from the node to other nodes in a network in the node comprises:
transmitting, by a node, a predetermined amount of test packets to other nodes in the network for obtaining transmission latencies of the test packets in respective routes;
respectively calculating transmission latency averages of the test packets in the respective routes, and saving the transmission latency averages as the routing latency information.

Annex 11. The method according to annex 10, further comprising:
respectively calculating transmission latency variances of the test data packets in the respective routes, and saving the transmission latency variances as the routing latency information.

Annex 12. The method according to annex 10, wherein selecting a route most approximate to the determined transmission latency requirement from the available routes comprises:

calculating difference values between the transmission latency requirement and the transmission latency averages in the respective available routes, and selecting the available route with the minimal absolute difference value.

Annex 13. The method according to annex 12, further comprising:

selecting preferentially the available route having the transmission latency average smaller than the transmission latency requirement.

Annex 14. The method according to annex 11, wherein selecting a route most approximate to the determined transmission latency requirement from the available routes comprises:

calculating difference values between the transmission latency requirement and the transmission latency averages in the respective available routes, and selecting the available route with the minimal absolute difference value;

selecting preferentially the available route with the minimum transmission latency variance in case that the absolute difference values corresponding to multiple available routes are equal.

Annex 15. The method according to annex 9, further comprising:

updating the stored latency information according to the actual latency of the present transmission of the data packet, after transmitting the data packet.

Annex 16. A program product with machine-readable instruction codes stored thereon, when the instruction codes are read and executed by a machine, the method of controlling route selection according to one of annexes 9-15 can be executed.

Annex 17. A storage medium with machine-readable instruction codes carried thereon, when the instruction codes are read and executed by a machine, the method of controlling route selection according to one of annexes 9-15 can be executed.

Although illustrative embodiments have been described herein, it should be understood that various other changes, replacements and modifications may be affected therein by one skilled in the art without departing from the scope or spirit of the invention. The terms "comprise", "include" or any other variation thereof of the embodiments of the present invention are intended to cover a non-exclusive inclusion, such that a process, method, article, or apparatus that comprises a list of elements does not include only that element but may include other elements not expressly listed or inherent to such process, method, article, or apparatus. In case of no more limitation, the element defined by a statement "comprising a" does not exclude the case where an additional element also exists in the process, method, article or apparatus comprising the element.

We claim:

1. A wireless network device comprising: and
a memory configured to store routing latency information for routing to other nodes in a network;
a processor configured to determine transmission latency requirement of transmitting data packets to a destination node according to transmission latency requirement information carried in the data packets after obtaining the data packets to be transmitted,
query available routes to the destination node, and the stored latency information corresponding to the available routes, and
select a route most approximate to the determined transmission latency requirement from the available routes according to a query result of the query module, and transmit the data packets,
wherein the memory is further configured to
transmit a predetermined amount of test packets to other nodes in the network for obtaining transmission latencies of the test packets in respective routes,
calculate respectively transmission latency averages of the test packets in the respective routes and save the transmission latency averages as the routing latency information, and
calculate respectively transmission latency variances of the test data packets in the respective routes and save the transmission latency variances as the routing latency information, and
wherein the processor is further configured to
calculate difference values between the transmission latency requirement and the transmission latency averages in the respective available routes, select the available route with the minimal absolute difference value, and
select preferentially the available route with the minimum transmission latency variance in case that the absolute difference values corresponding to multiple available routes are equal.

2. The device according to claim 1, wherein the processor is configured to
calculate difference values between the transmission latency requirement and the transmission latency averages in the respective available routes, and select the available route with the minimal absolute difference value.

3. The device according to claim 2, wherein the processor is further configured to
select preferentially the available route having the transmission latency average smaller than the transmission latency requirement.

4. The device according to claim 1, wherein the processor is configured to
update the latency information stored in the memory according to the actual latency of the present transmission of the data packet, after transmitting the data packet.

5. A wireless network system, comprising two or more wireless network devices that are able to communicate with each other, each of the wireless network devices comprising:
a memory configured to store routing latency information for routing to other wireless network devices in a network; and
a processor configured to determine transmission latency requirement of transmitting data packets to a destination wireless network device according to transmission latency requirement information carried in the data packets after obtaining the data packets to be transmitted,
query available routes to the destination wireless network device, and the stored latency information corresponding to the available routes, and
select a route most approximate to the determined transmission latency requirement from the available routes according to a query result of the query module, and transmit the data packets,
wherein the memory is further configured to
transmit a predetermined amount of test packets to other wireless network devices in the network for obtaining transmission latencies of the test packets in respective routes, calculate respectively transmission latency averages of the test packets in the respective routes and save the transmission latency averages as the muting latency information, and calculate respectively transmission latency variances of the test data packets in the respective routes and save the transmission latency variances as the routing latency information, and wherein the processor is further configured to calculate difference values between the transmission latency requirement and the transmission latency averages in the respective available routes, select the available route with the minimal absolute difference value, and select preferentially the available route with the minimum transmission latency variance in case that the absolute difference values corresponding to multiple available routes are equal.

6. A method of controlling route selection, comprising:

storing, in a node, routing latency information for routing from the node to other nodes in a network;

determining by the current node transmission latency requirement of transmitting data packets from the present node to a destination node according to transmission latency requirement information carried in the data packets after the present node obtains the data packets to be transmitted;

querying an available route from the present node to the destination node and the stored latency information corresponding to the available route; and selecting a route most approximate to the determined transmission latency requirement from the available routes according to the query result, to transmit the data packets, wherein storing routing latency information for routing from the node to other nodes in a network in the node comprises:

transmitting, by a node, a predetermined amount of test packets to other nodes in the network for obtaining transmission latencies of the test packets in respective routes;

respectively calculating transmission latency averages of the test packets in the respective routes, and saving the transmission latency averages as the routing latency information, wherein the method further comprises:

respectively calculating transmission latency variances of the test data packets in the respective routes, and saving the transmission latency variances as the routing latency information, and wherein selecting a route most approximate to the determined transmission latency requirement from the available routes comprises:

calculating difference values between the transmission latency requirement and the transmission latency averages in the respective available routes, and selecting the available route with the minimal absolute difference value; and selecting preferentially the available route with the minimum transmission latency variance in case that the absolute difference values corresponding to multiple available routes are equal.

7. The method according to claim 5, wherein selecting a route most approximate to the determined transmission latency requirement from the available routes comprises:

calculating difference values between the transmission latency requirement and the transmission latency averages in the respective available routes, and selecting the available route with the minimal absolute difference value.

8. The method according to claim 7, further comprising:

selecting preferentially the available route having the transmission latency average smaller than the transmission latency requirement.

9. The method according to claim 6, further comprising:

updating the stored latency information according to the actual latency of the present transmission of the data packet, after transmitting the data packet.

10. A program product embodying a non-transitory computer readable medium that stores instructions executable by a processor to perform:

storing, in a node, routing latency information for routing from the node to other nodes in a network;

determining by the current node transmission latency requirement of transmitting data packets from the present node to a destination node according to transmission latency requirement information carried in the data packets after the present node obtains the data packets to be transmitted;

querying an available route from the present node to the destination node and the stored latency information corresponding to the available route; and selecting a route most approximate to the determined transmission latency requirement from the available routes according to the query result, to transmit the data packets, wherein storing routing latency information for routing from the node to other nodes in a network in the node comprises:

transmitting, by a node, a predetermined amount of test packets to other nodes in the network for obtaining transmission latencies of the test packets in respective routes;

respectively calculating transmission latency averages of the test packets in the respective routes, and saving the transmission latency averages as the routing latency information, wherein the computer product further comprises instructions to perform:

respectively calculating transmission latency variances of the test data packets in the respective routes, and saving the transmission latency variances as the routing latency information, and wherein selecting a route most approximate to the determined transmission latency requirement from the available routes comprises:

calculating difference values between the transmission latency requirement and the transmission latency averages in the respective available routes, and selecting the available route with the minimal absolute difference value; and selecting preferentially the available route with the minimum transmission latency variance in case that the absolute difference values corresponding to multiple available routes are equal.

11. A non-transitory computer readable medium that stores instructions executable by a processor to perform:

storing, in a node, routing latency information for routing from the node to other nodes in a network;

determining by the current node transmission latency requirement of transmitting data packets from the present node to a destination node according to transmission latency requirement information carried in the data packets after the present node obtains the data packets to be transmitted;

querying an available route from the present node to the destination node and the stored latency information corresponding to the available route; and selecting a route most approximate to the determined transmission latency requirement from the available routes according to the query result, to transmit the data packets, wherein storing routing latency information for routing from the node to other nodes in a network in the node comprises:

transmitting, by a node, a predetermined amount of test packets to other nodes in the network for obtaining transmission latencies of the test packets in respective routes;

respectively calculating transmission latency averages of the test packets in the respective routes, and saving the transmission latency averages as the routing latency information, wherein the instructions further comprise instructions to perform:

respectively calculating transmission latency variances of the test data packets in the respective routes, and saving the transmission latency variances as the routing latency information, and wherein selecting a route most approximate to the determined transmission latency requirement from the available routes comprises:

calculating difference values between the transmission latency requirement and the transmission latency averages in the respective available routes, and selecting the available route with the minimal absolute difference value; and selecting preferentially the available route with the minimum transmission latency variance in case that the absolute difference values corresponding to multiple available routes are equal.

* * * * *